United States Patent [19]
Dobson et al.

[11] 3,920,954
[45] Nov. 18, 1975

[54] ELECTRIC COFFEE MAKER WITH A THERMOSTAT AND HEAT SINK CONTROL

[75] Inventors: William C. Dobson; James W. Straughn, both of West Bend, Wis.

[73] Assignee: Dart Industries Inc., Los Angeles, Calif.

[22] Filed: Apr. 28, 1975

[21] Appl. No.: 572,360

[52] U.S. Cl. .................... 219/441; 99/281; 165/96; 219/439; 219/515; 236/1 R
[51] Int. Cl.² ........................................ F27D 11/02
[58] Field of Search .......... 219/212, 251, 252, 430, 219/435, 438, 439, 441, 442, 449, 462, 510, 511, 515; 236/1 R; 337/366; 317/132; 99/281, 282; 165/26, 96

[56] References Cited
UNITED STATES PATENTS

| | | | |
|---|---|---|---|
| 2,611,855 | 9/1952 | Turner | 219/212 |
| 3,010,006 | 11/1961 | Schwaneke | 219/442 |
| 3,091,061 | 6/1963 | Rodwick et al. | 99/281 |
| 3,147,369 | 9/1964 | Salton | 219/449 |
| 3,155,883 | 11/1964 | Roth et al. | 317/132 |
| 3,177,933 | 4/1965 | Webb | 165/96 |
| 3,225,820 | 12/1965 | Riordan | 165/26 |
| 3,425,336 | 2/1969 | Buflim et al. | 99/281 |
| 3,666,920 | 5/1972 | Price | 219/449 |
| 3,778,594 | 11/1973 | Wightman | 219/430 |
| 3,781,521 | 12/1973 | Kircher | 219/442 |

*Primary Examiner*—Volodymyr Y. Mayewsky
*Attorney, Agent, or Firm*—Kenneth J. Hovet; Leigh B. Taylor; Paul R. Wylie

[57] ABSTRACT

A device is provided for regulating the strength of coffee brewed in a coffee percolator. A rotatable lever having a heat conductive and non-heat conductive end section is interposed between a heat sink and a thermostat. When the lever is moved to position the conductive section between the heat sink and thermostat, heat will be conducted away from the thermostat. This will delay the thermostat response to the brew temperature and maintain the coffee maker heater energized. This extends the percolation cycle and increases brew strength. When the non-heat conductive end section is positioned between the thermostat and heat sink, the thermostat will not be cooled and the thermostat will deactivate the coffee maker heater sooner, at approximately its normally, uninfluenced percolation time and brew strength.

6 Claims, 7 Drawing Figures

ELECTRIC COFFEE MAKER WITH A THERMOSTAT AND HEAT SINK CONTROL

BACKGROUND OF THE INVENTION

1. Field of the Invention

The present invention relates to a beverage brewing system and, more particularly, to a device for adjusting the brewing cycle in an electric coffee maker.

2. Description of the Prior Art

There are numerous important variables involved in producing a savory brew of coffee. One of the important variables is the brewing time, i.e., the time a predetermined amount of hot water is in contact with a predetermined amount of coffee grounds to produce a desired brew strength. In the case of electric percolators, the brewing time is regulated by the time the primary heating element remains energized to force liquid upwardly through a central tube and out over a basket containing coffee grounds.

The time the heating element is energized can be adjusted by timer mechanisms, by a variable thermostat which de-energizes the heating element when the brew reaches a predetermined temperature, or by utilizing a fixed value thermostat and varying the temperature sensed by the thermostat. Representative of the latter technique is that shown in U.S. Pat. Nos. 3,059,092 and 3,425,336. In both patents, an insulative air gap between the heat source and thermostat is manually created by a cam and lever means to produce a lower effective temperature at the thermostat. This causes a longer brew cycle in that a longer period of time elapses before the thermostat reaches a prefixed value and deactivates the coffee heater.

A disadvantage with the air gap technique is its unreliability. It is known that dry air is a better insulator than humid air. As such, a coffee strength setting may result in different brews depending on the weather and ambient conditions. Additionally, the ambient air surrounding the coffee maker heater is likely to become hotter upon successive uses. This, of course, would result in a stronger brew.

SUMMARY OF THE INVENTION

The present invention provides a beverage brewing system capable of positively adjusting the brewing cycle in an electric coffee maker. The system comprises a fixed-value thermostat mounted in heat conducting relation to the bottom of the brew compartment. A rotatable lever is located adjacent said thermostat having an end portion with a heat conductive section and a non-heat conductive section.

In heat conducting relation to the lever end portion is a heat sink which transmits heat away from the thermostat and thereby lowers its overall temperature. This will only occur when the heat conductive section is located directly adjacent to the thermostat by rotation of the lever to a strong setting. In this manner the thermostat will maintain the percolator heater in an energized condition and prolong the percolation cycle for a stronger brew. When the lever is rotated to a mild setting, the non-heat conductive section is located adjacent the thermostat. This prevents heat from being removed from the thermostat and results in its reaching the heater deactivation temperature without delay.

DESCRIPTION OF A PREFERRED EMBODIMENT

Figure 1:
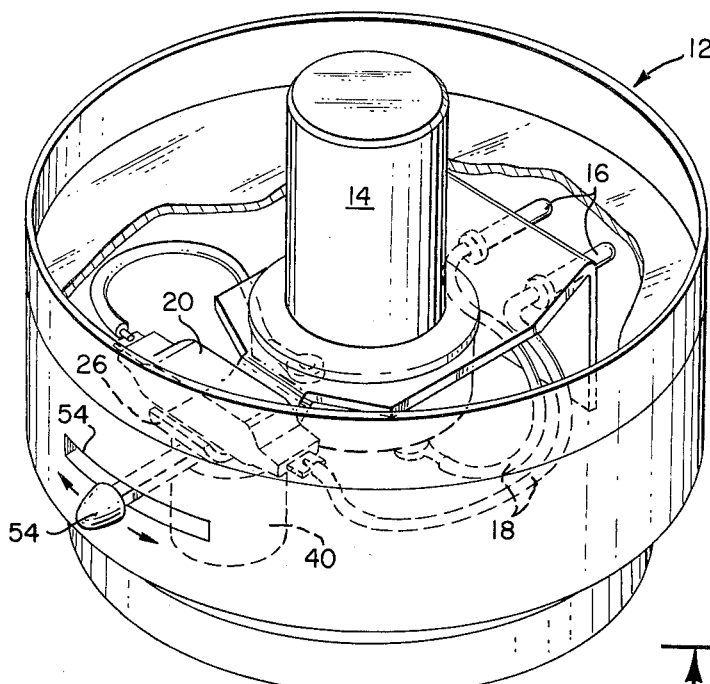
FIG. 1 is a perspective view of a coffee maker base housing partially broken-away showing the brew strength device of the present invention.
Figure 6:
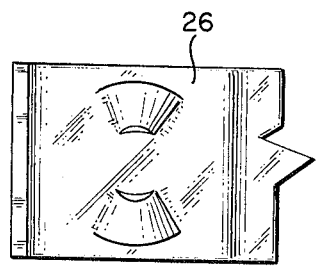
FIG. 6 is a partial enlarged view of an embossed element constructed in accordance with the present invention.
Figures 2, 7:
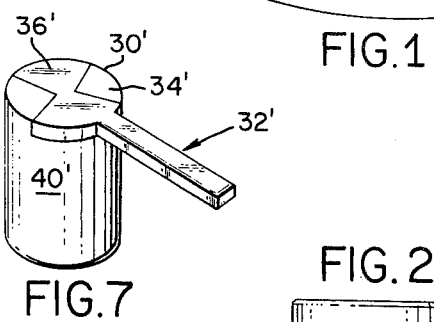
FIG. 2 is a partial side elevation view partly in section of the device shown in FIG. 1.
FIG. 7 is a heat sink and rotatable lever assembly constructed in accordance with a modification of the present invention.
Figure 3:
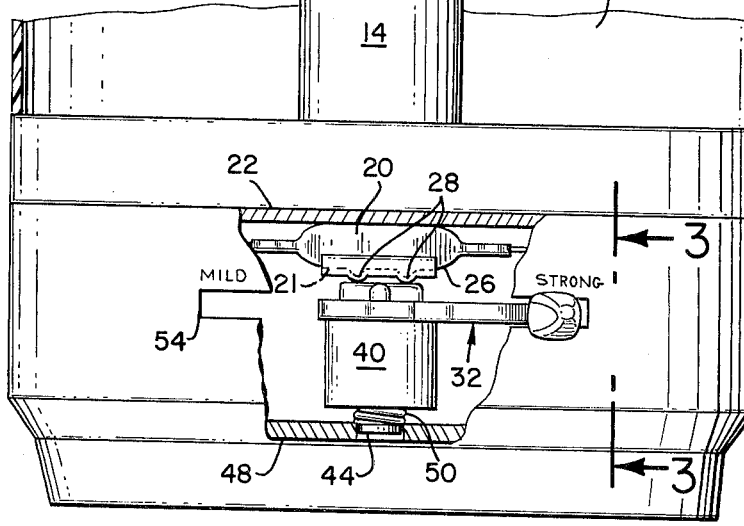
FIG. 3 is an exploded perspective view taken along line 3—3 of FIG. 2.
Figure 4:
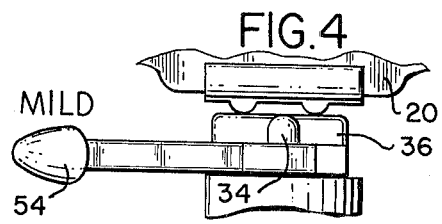
FIG. 4 is an enlarged fragmentary elevation view of the rotatable lever shown at a mild setting.

Referring now to the drawings and particularly to FIGS. 1 and 2 thereof, a base housing 12 is shown enclosing electrical parts and components for the brewing cycle of an electric coffee maker. Although forming no essential part of the invention, the aforementioned electric coffee maker is deemed to include a percolator tube, a coffee basket having a liquid distributor cover, a spout, lid and handle (not shown).

The base housing 12 encloses electric heater 14 and electric outlet connectors 16 which are connected with conductors 18 to the heater 14 and thermostat 20. The thermostat is located preferably directly in contact with the bottom 22 of the coffee maker beverage compartment 24. It is contemplated that the heater 14 heats water in the beverage compartment 24 and causes local vaporization between the heater and percolator tube (not shown) to force water through the tube out over a basket of coffee grounds in a manner well-known in the art. Note that the heater 14 is shown as extending upwardly from the bottom 22 of the beverage compartment 24. However, it is within the contemplation of this invention that a heater secured beneath the bottom 22 and about flush therewith would work equally well for the purposes of the present invention. In either case, the thermostat 20 is located to sense the temperature of the brew transmitted through the bottom wall 22. It is preferably offset a distance from the heater 14 to more accurately sense the brew temperature rather than the direct heat emanating from the heater by conduction through plate 22.

Located in heat conducting relation to thermostat 20 is end portion 30 of rotatable lever 32. The end portion includes a first heat conductive section 34 and a second non-heat conductive section 36. In the embodiments shown in FIGS. 2–5 the first section is a straight ridge integral with heat sink 40. The ridge is constructed to extend through slot 37 of the lever end portion 30 and extend therethrough a distance coextensive with a similar ridge 36 which extends generally transversely thereof. The ridge 36 is integral with the end portion 30 of the lever 32.

For purposes of the present invention, the lower portion 21 of the thermostat casing may be smooth or embossed with at least one protuberance or it may have attached thereto an embossed element 26. The smooth thermostat lower portion is preferably used in conjunction with the embodiment shown in FIG. 7 to be hereinafter described. Use of the embossed thermostat casing or separate embossed element 26 is deemed essential to create a heat conductive and non-heat conductive condition between the heat sink and thermostat when used with the ridges 34 and 36.

As best shown in FIGS. 2-6, embossed element 26 is typically spot welded or clamped to the thermostat 20 and is provided with spaced apart protuberances, heat sink ridge 34 is prevented from contacting the planar area 27 and effecting a heat transfer from the thermostat. If only one protuberance is utilized, it can operate with ridge 36 to simply displace the heat conductive ridge 34 a distance away from bracket 26 to prevent heat transfer. Of course, any number or configuration of protuberances and ridges could be used with the present invention as long as they are disposed in a cooperating relationship to effect a heat conducting and non-heat conduction condition.

The heat sink 40 includes a bottom downwardly extending boss 42 which is adapted to loosely fit into aperture 44 in the bottom 48 of the base housing 12. In this manner the heat sink can be freely rotated about its longitudinal axis. In the embodiment shown in FIGS. 1-6, rotation is effected by engagement of heat sink ridge 34 with slot 37 of lever 32. It is preferable that the entire assembly be resiliently urged against the thermostat 20 by compression spring 50. This provides a firm frictional engagement between parts for wobble-free rotation.

It will be noted that the housing 12 includes an elongated slot 54 with the words "Mild" and "Strong" at the opposite ends thereof. These words indicate settings which the lever can be manually moved to by grasping the lever tip 54 extending through the slot radially outward of the housing 12.

Figure 5:
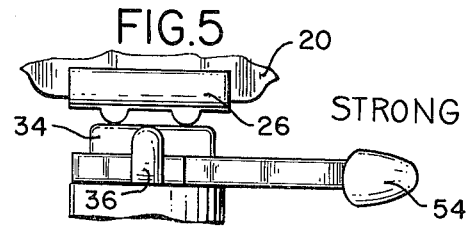
FIG. 5 is an enlarged fragmentary elevation view of the rotatable lever shown at a strong setting.

With particular reference to FIGS. 2 and 5, lever tip end 56 is shown at a strong setting. At this setting heat will be transferred from the thermostat 20 to the heat sink 40 through the area of contact between protuberances 28 and ridge 34. As such, heat from the coffee brew will be drawn away from the thermostat resulting in a delayed sensing of the brew temperature with the concommittant extended brew cycle and a stronger brew.

In FIG. 7 there is shown an alternative embodiment wherein the second non-heat conductive section 36' integral with lever 32' is impressed into corresponding cut-away portions on the top of heat sink 40'. The first heat conductive sections are shown by reference numeral 34' and are simply the remaining uncovered portions of heat sink 40'. The overall top surface of the heat sink presents a contoured surface which is adapted to engage lower portion 21 of the thermostat 20. When the non-heat conductive section 36' is rotated into contact with the thermostat, substantially no heat will be transferred to the heat sink 40' and a mild brew will result. The converse will occur when the lever 32' is moved to a strong setting whereby heat conductive section 34' will be located in heat conducting relation to portion 21 of thermostat 20. This embodiment is preferably used without the protuberances as described in conjunction with FIGS. 1-6.

While the invention has been described with respect to a preferred embodiment, it will be apparent to those skilled in the art that various modifications and improvements may be made without departing from the spirit and scope of the invention. Accordingly, it is to be understood that the invention is not to be limited by the specific illustrative embodiment, but only by the scope of the appended claims.

What is claimed is:

1. In an electric coffee maker having a brew compartment mounted upon a base housing, said housing enclosing electrical parts with an electric heater located proximate the bottom of said compartment wherein the improvement comprises:
   a thermostat located in heat conducting relation to the bottom of the brew compartment, said thermostat sensing the temperature of said bottom and deactivating the electric heater when said temperature reaches a predetermined level; and,
   a rotatable lever having an end portion including a heat conductive section and a non-heat conductive section located in heat conducting relation to said thermostat, said lever including a heat sink in heat conducting relation to said end portion whereby said heat sink being mounted for rotation and biased by spring means toward the thermostat, said heat conductive section operating to transmit heat to said heat sink from said thermostat when located directly adjacent said thermostat to thereby delay the deactivation of said electric heater and said non-heat conductive section operating to inhibit heat transfer from said thermostat to allow said thermostat to deactivate the electric heater without delay.

2. The device of claim 1 including an embossed element interposed between said thermostat and said lever end portion, said embossed element having at least one protuberance positioned adjacent said lever end portion.

3. The device of claim 1 wherein said heat conductive section is an end portion of said heat sink and said non-heat conductive section is an insulating material integral with said lever and covering a predetermined portion of said heat sink.

4. The device of claim 2 wherein said heat conductive and non-heat conductive sections are ridges extending in diverse directions and disposed in a cooperating relationship with said protuberance to prevent said heat conductive section from contacting said element.

5. The device of claim 4 wherein said spring means is a resilient coil.

6. The device of claim 4 wherein said lever is fixed to said heat sink and includes an arm portion extending through an elongated slot in the base portion housing.

* * * * *